United States Patent Office 2,986,028
Patented May 30, 1961

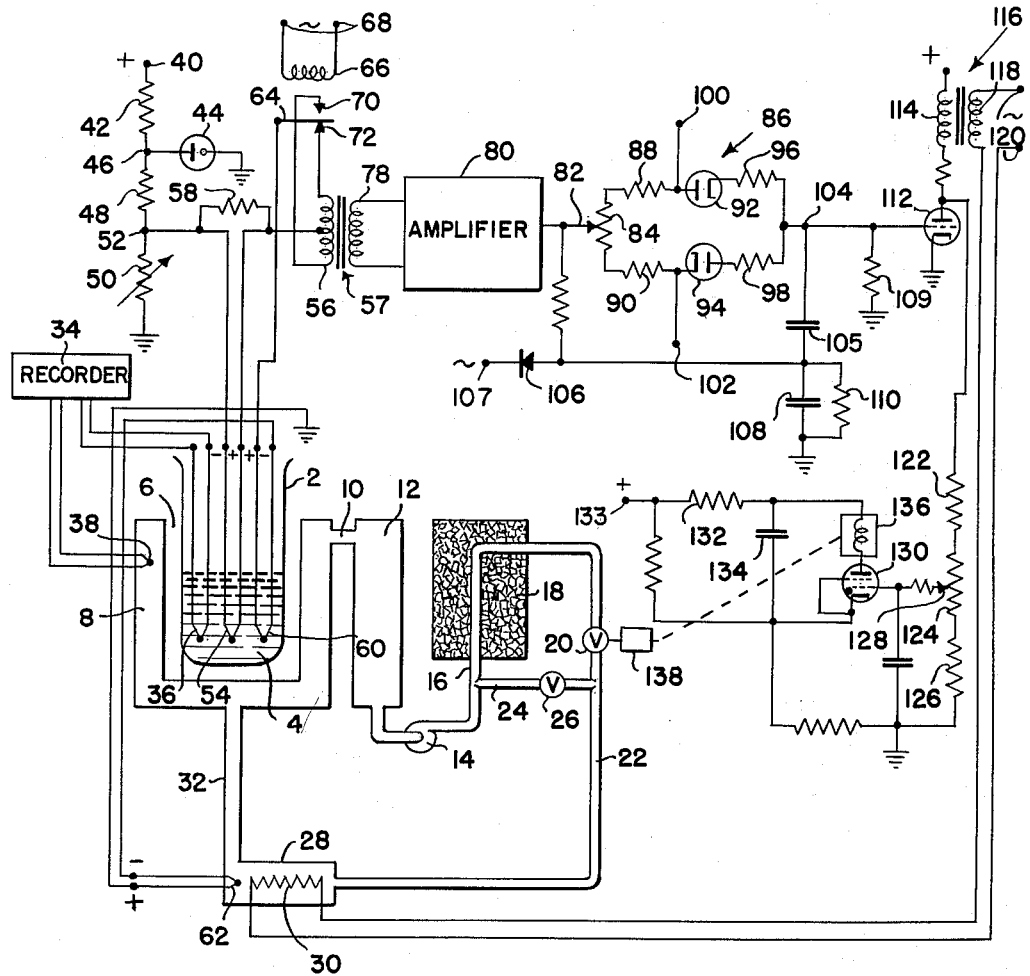

2,986,028

APPARATUS FOR THE DETERMINATION OF RATES OF HEAT ABSORPTION OR EVOLUTION FOR MATERIALS

Elbert Neil Shawhan, Newtown Square, Pa., assignor to Sun Oil Company, Philadelphia, Pa., a corporation of New Jersey Filed Oct. 10, 1956, Ser. No. 615,164

4 Claims. (Cl. 73—15)

This invention relates to apparatus for the determination of rates of heat absorption or evolution of materials undergoing changes of state.

Useful information on the nature of a material such as a sample of wax can be obtained from its rate of heat absorption or evolution as it changes state. Cooling curves are commonly obtained by recording the temperature of a sample of wax or similar material as it changes from the liquid to the solid state while cooling to the surrounding ambient temperature. However, cooling curves obtained in this manner lose useful detail because of the change in cooling rate which is rapid near the beginning of the run and slow at the end due to the decrease in temperature difference between the sample and its surroundings.

It is one object of the present invention to provide an apparatus by means of which the time rate of temperature change of a material may be determined as the material, or components thereof, are undergoing a change of state. In particular, the apparatus comprises the maintenance of a substantially constant temperature gradient between the material undergoing measurement and its surroundings with which it is in heat transfer relationship. Specifically, in accordance with the invention, the material undergoing measurement is located in heat transfer relationship with a liquid which is selectively heated or cooled to maintain constant the temperature difference just mentioned. Recording means responsive to the temperature of the material then automatically provides a record of the change of temperature of the material with time. From this record useful information may be derived in a fashion well known in the art and which need not be detailed. In view of the fact that the temperature gradient is maintained constant, the rate of heat transfer is not affected by the change of such gradient as occurred in measurements heretofore made. The result is that details of the heat absorption or evolution characteristics may be obtained.

The apparatus about to be described in detail is particularly useful for the measurement of the heat absorption or evolution characteristics of waxes undergoing change of state, and for consistency of description the material will be hereafter generally referred to as wax. However, the apparatus is of more general applicability to many other mixtures such as resins, or the like, containing mixtures of constituents and showing variations in thermal characteristics as the various constituents undergo changes of state. It will be understood, therefore, that the invention is not to be regarded as limited in its application to waxes.

The general objects of the invention referred to above as well as other objects particularly relating to details of the apparatus will become apparent from the following description read in conjunction with the accompanying drawing in which the single figure is a diagram illustrating a preferred form of the apparatus.

The apparatus will be first described with reference to its use in the making of measurements during the transition of a wax sample from its liquid to its solid state. As will later appear, the apparatus with minor changes in connections may be used to make measurements during the reverse transition of a wax from its solid to its liquid state. However, the former use is generally simpler since the starting point is a homogeneous state of the wax sample.

A suitable container 2 such as a glass tube contains the wax sample 4 which is initially in its liquid state. The tube 2 is located in an opening 6 in a bath structure 8 through which a liquid is circulated so as to have heat exchange relationship with the wax. The outlet 10 from the bath is desirably connected to the upper end of a standpipe 12 at the lower end of which there is connected the recirculating pump 14 arranged to deliver the bath liquid at 16 through a cooling region indicated at 18 which may be in the form of a container of ice. From 16 the liquid passes through a valve 20 which is automatically controlled as will be hereafter described and thence to a pipe 22. The cooling region 18 is arranged to be by-passed by a connection 24 containing a manually adjustable valve 26. The pipe 22 communicates with a heating chamber 28 in which there is located a heater resistance 30. From the chamber 28 the liquid passes through 32 to the inlet of the bath 8. By control of current through the heater resistance 30 and by automatic control of the valve 20, the valve 26 being in a partially throttling condition with respect to liquid flowing through the by-pass 24, it will be evident that the temperature of the liquid in the bath may be controlled. In accordance with the invention this control is so carried out that the temperature difference between the wax sample and the bath is maintained substantially constant to eliminate from the measurements the factor of a considerable change of this temperature difference which, as already stated, would produce rapid cooling at first and later slower cooling of the wax sample so as to interfere with adequate interpretation of the results secured.

A temperature recorder 34 operated by thermocouples is of conventional type and desirably records not only the temperature of the wax sample but also the temperature of the bath, the respective inputs being from the thermocouple 36 immersed in the wax sample and from the thermocouple 38 immersed in the bath liquid. Measurement of the temperature of the bath is desirable as a check on proper operation since the records should show a substantially constant temperature difference between the sample and the bath.

Located between a positive potential supply terminal 40 and ground is an arrangement of resistors 42, 48 and 50 in series, the last being adjustable and of low resistance value in comparison with the resistors at 42 and 48. To maintain the potential at 52 substantially constant there is connected between junction 46 of the resistors 42 and 48 and ground a gaseous type voltage regulator tube 44. It may be noted that this accounts for the use of a quite high voltage supply despite the fact that the potential appearing at 52 must be only of the order of the potential produced by a thermocouple. Between the ungrounded terminal 52 of the variable resistor 50 and a center tap of the primary winding 56 of a transformer 57 there is located the thermocouple 54 which is immersed in the wax and shunted by a resistor 58 of low resistance value.

A third thermocouple 60 is immersed in the wax 4 and is arranged in series opposition with a thermocouple 62 which may be located elsewhere in the bath liquid but is desirably in the portion of the liquid passing from the heater 30 to the bath. The two thermocouples just mentioned are in series between ground and the armature member 64 of a chopping relay having its coil 66 energized from alternating current supply terminals 68 which may be supplied with current at the commercial sixty-cycle frequency. The relay armature 64 is arranged to contact alternately at the frequency of the coil supply with contacts 70 and 72 which are connected to the opposite ends of the transformer primary 56. The secondary 78 of the transformer 57 provides an input to an amplifier 80 providing high gain at the sixty-cycle chopping frequency. The output of the amplifier 80 is connected to the adjustable contact 82 of a potentiometer 84 forming part of a synchronous rectifier 86 of the type illustrated in my Patent No. 2,559,173, dated July 3, 1951. This synchronous rectifier comprises, connected to the ends of the potentiometer resistance 84, resistors 88 and 90 connected respectively to the anode of a diode 92 and the cathode of a diode 94, the other electrodes of which are connected together and to a terminal 104 through resistors 96 and 98. Resistors 88 and 90 are of equal value and the same is true of resistors 96 and 98. Synchronous reference signals are provided from the terminals 100 and 102 connected from the sixty-cycle supply respectively to the anode of diode 92 and the cathode of diode 94. As described in my patent the result is the accumulation of a direct potential on the capacitor 105, the potential corresponding to the signal produced at the input of the amplifier 80 which is in turn derived from the direct potential resulting from the thermocouple arrangement as will be later more fully described. The lower terminal of the capacitor 105 is connected to the filter arrangement of a high capacity capacitor 108 shunted by a high resistance 110 and supplied with a direct potential through the crystal rectifier 106 from a low voltage alternating supply terminal 107. It will be noted that the capacitor 105 has its terminal 104 connected to ground through a resistor 109 which is of high resistance value and is such as to provide a desired time constant in the circuit.

The direct potential appearing at 104 is used to control the current through the heater 30 and this is desirably accomplished through the control of direct current through the control coil of a saturable reactor indicated at 116, the control coil being indicated at 114. For this purpose there is indicated at 112 a triode, the grid of which is connected to the terminal 104, and the anode of which is connected to a positive supply terminal through the coil 114, the cathode of the tube being grounded. In actual practice, to secure a sufficient current flow, the tube 112 is actually replaced by a number of tubes in parallel. The alternating current winding 118 of the saturable reactor 116 is connected in series with the heater resistance 30 between alternating supply input terminals 120. The operation of the saturable reactor is as usual: For low values of current flow through winding 114 the reactor offers a high reactance and consequently reduces the current through the heater; on the other hand when a large current flows through coil 114 a low reactance is presented and a higher current may flow through the heater.

Between the anode of triode 112 and ground there is connected the arrangement of a resistor 122, the resistance 124 of a potentiometer, and a resistor 126. The potentiometer contact 128 is connected to the control grid of a thyratron 130 in the anode circuit of which there are included the relay 136 and the high resistance 132 running to a positive supply terminal 133. A capacitor 134 of suitable value is connected between the cathode of the thyratron 130 and the junction of resistor 132 to the coil of relay 136. The circuit elements are chosen in conventional fashion to provide pulsing of the thyratron circuit when the control grid of the thyratron is sufficiently positive, the pulsing being at a rate primarily determined by the time constant of the arrangement of resistor 132 and capacitor 134. The arrangement is such that when pulsing occurs the valve 20 is opened through its actuator 138 controlled by relay 136. While many different arrangements may be used for control of the valve 30, it has been found desirable to use at 138 a stepping relay of conventional type which, upon receipt of an initiating impulse from relay 136 will step about through a cycle during which the valve 20 is opened and then come to rest with the valve again closed unless another initiating impulse is received from relay 136. The details of this are conventional and form no essential part of the present invention.

The operation of the apparatus described is as follows:

The wax 4 is initially in its liquid state above the temperature at which solidification of any of its constituents would occur. Assuming that the wax temperature and the bath temperature have a desired temperature difference, the series arrangement of the thermocouples responsive thereto produces a net potential which is balanced by the potential appearing across the thermocouple 54 and its shunt 58 and the potential between terminal 52 and ground. The result, therefore, would be no flow of current through either half of the transformer primary 56 when armature 64 makes contact with either contact 70 or contact 72 with the result of no alternating input to the amplifier 80. To secure this balance, it is evident that the series potentials across the thermocouple 54 and across the resistor 50 must correspond to the desired temperature difference translated into terms of the potentials produced by the thermocouples 60 and 62. If these thermocouples had linear voltage-temperature characteristics, there would be no need for the thermocouple 54, the potential drop across resistor 50 then being determinative of the temperature difference which should exist to provide zero input to the amplifier 80. However, these characteristics are not generally linear and to provide a substantial degree of correction for their non-linearity there is included the additional potential provided by the thermocouple 54 in conjunction with its shunting resistor 58. Using the arrangement illustrated a sufficient compensation for the non-linearity is secured. Neglecting, therefore, for simplicity of description the non-linearity which may be involved, it may be said that the potential provided between terminal 52 and ground across the adjustable resistor 50 determines the temperature difference which is to be maintained between the sample 4 and the bath liquid. This desired temperature difference may be adjusted by adjustment of value of the resistor 50.

Assume, now, that the temperature difference increases, so that the temperature of the bath liquid drops abnormally below the temperature of the wax. There will then no longer be a balancing of the net potential in the circuit of the primary of transformer 57 with the result that as chopping occurs an alternating input will be provided to the amplifier 80 which, being amplified, provides through the synchronous rectifier 86 an increase of positive potential at the grid of triode 112 which in turn provides an increase of current flow through the control winding 114 of the saturable reactor. The result is that this reactor offers less reactance to the alternating current flowing thereto and increases the current through resistor 30 to effect heating of the recirculating bath liquid. It may be noted that when this occurs the potential of the control grid of thyratron 130 is lowered to prevent pulsing of its circuit.

On the other hand, if the bath temperature rises too high, there will be produced at the input to amplifier 80 an alternating potential which is shifted 180° from that which occurred in the operation last described. In view of this shift of the phase of the output from the amplifier the synchronous rectifier will produce a more negative potential at the grid of triode 112 thereby reducing the direct control current through coil 114, increasing the reactance of reactor 116 and thereby reducing the current through heater 30. If the difference is sufficient, as determined by the setting of potentiometer contact 128, the rise of potential at the anode of triode 112 will cause an increase in the positive direction of the potential of the thyratron control grid and the thyratron circuit will then pulse to produce opening of the valve 20. This provides circulation of some of the bath liquid through the cooling zone 18, resulting in drop of the temperature of the recirculating bath liquid to provide the corrective action.

From the foregoing it will be evident that the operation of the apparatus is such as to maintain continuously an approximately constant difference in temperature between the wax sample and the bath liquid. The rate of heat transfer is thus maintained substantially constant, and the time rate of cooling of the wax sample is then dependent to a quite uniform extent throughout an entire operation upon the characteristics of the wax constituents as they change from their liquid to their solid states. The result is that the recorder 34 will exhibit a temperature variation with time reflecting the change of state characteristics of the wax constituents and the curve produced in the recorder 34 may then be analyzed in the usual fashion. By the maintenance of the constant temperature gradient the characteristics due to the constituents of the wax are rendered more particularly discernible through the period when the wax temperature is relatively high. It will be evident that by control of the temperature difference through adjustment of resistor 50 the rate of heat transfer may be very much slowed down and, in fact, with initial cooling occurring under conditions in which the bath temperature is only slightly lower than the wax temperature and possibly substantially above the temperature corresponding to complete solidification of the wax. In the usual practice, of course, the bath temperature had to be below the temperature of complete solidification if the determinations were carried out to that end point.

It will be evident that the apparatus is equally applicable to the determination of the characteristics of a heating curve involving the melting of a wax or other material, there being required only a reversal of polarity of the reference voltage so that the apparatus will maintain the temperature of the bath in excess of that of the wax to a predetermined degree. In such case, operation is continued until all of the constituents of the wax are melted.

What is claimed is:

1. Apparatus for the determination of the rate of temperature change of a material comprising a container for the material, means located in heat transfer relationship with said material, a thermocouple responsive to the temperature of said material, a thermocouple responsive to the temperature of the first mentioned means, means providing a series circuit including said thermocouples connected in opposition and means providing a reference voltage, means responsive to the current in said circuit to maintain approximately constant the temperature difference between said material and the first mentioned means by controlling the temperature of the first mentioned means, and means for indicating the temperature of said material, said current responsive means comprising means for converting the current in said series circuit to alternating current, means for amplifying the alternating current, means for synchronously rectifying the amplified alternating current to provide a direct potential, and means controlled by said direct potential to control the temperature of the first mentioned means.

2. Apparatus for the determination of the rate of temperature change of a material comprising a container for the material, means located in heat transfer relationship with said material, a thermocouple responsive to the temperature of said material, a thermocouple responsive to the temperature of the first mentioned means, means providing a series circuit including said thermocouples connected in opposition and means providing a reference voltage, means responsive to the current in said circuit to maintain approximately constant the temperature difference between said material and the first mentioned means by controlling the temperature of the first mentioned means, and means for recording the changes of temperature of said material with time, said current responsive means comprising means for converting the current in said series circuit to alternating current, means for amplifying the alternating current, means for synchronously rectifying the amplified alternating current to provide a direct potential, and means controlled by said direct potential to control the temperature of the first mentioned means.

3. Apparatus for the determination of the rate of temperature change of a heated liquid material, comprising a container for the liquid, means located in heat transfer relationship with said material, a pair of thermocouples connected in opposition, one of said thermocouples being responsive to the temperature of said material and the other being responsive to the temperature of the first-mentioned means, means providing a constant reference voltage, a third thermocouple responsive to the temperature of said material, means providing a series circuit including said thermocouples and said means providing a reference voltage, means responsive to the current in said circuit to maintain approximately constant the temperature difference between said material and the first-mentioned means by controlling the temperature of the first-mentioned means, and means for indicating the temperature of said material.

4. Apparatus for the determination of the rate of temperature change of a heated liquid material, comprising a container for the liquid, means located in heat transfer relationship with said material, a pair of thermocouples connected in opposition, one of said thermocouples being responsive to the temperature of said material and the other being responsive to the temperature of the first-mentioned means, means providing a constant reference voltage, a third thermocouple responsive to the temperature of said material, means providing a series circuit including said thermocouples and said means providing a reference voltage, means responsive to the current in said circuit to maintain approximately constant the temperature difference between said material and the first-mentioned means by controlling the temperature of the first-mentioned means, and means for recording the changes of temperature of said material with time.

References Cited in the file of this patent

UNITED STATES PATENTS

| Number | Name | Date |
|---|---|---|
| 1,578,280 | Gibson | Mar. 30, 1926 |
| 1,678,865 | Lincoln | July 31, 1928 |
| 1,775,682 | Martin | Sept. 16, 1930 |
| 1,893,847 | Simpson | Jan. 10, 1933 |
| 1,911,191 | Harsch et al. | May 30, 1933 |
| 2,266,569 | Schneider | Dec. 16, 1941 |
| 2,463,944 | Borden | Mar. 8, 1949 |
| 2,478,362 | Tinkham et al. | July 5, 1949 |
| 2,494,135 | Maienshein | Jan. 10, 1950 |
| 2,578,890 | Ledin | Dec. 18, 1951 |
| 2,616,296 | Wannamaker | Nov. 4, 1952 |
| 2,672,751 | Lupfer et al. | Mar. 23, 1954 |
| 2,673,465 | Goodman et al. | Mar. 30, 1954 |